United States Patent
Laroche et al.

(10) Patent No.: US 12,128,353 B2
(45) Date of Patent: Oct. 29, 2024

(54) GAS DEHYDRATION COMPOSITION AND PROCESS TO REDUCE SOLVENT LOSSES

(71) Applicant: Dow Global Technologies LLC, Midland, MI (US)

(72) Inventors: Christophe R. Laroche, Lake Jackson, TX (US); John R. Dowdle, Lake Jackson, TX (US); Eric J. Klinker, Lake Jackson, TX (US)

(73) Assignee: Dow Global Technologies LLC, Midland, MI (US)

(*) Notice: Subject to any disclaimer, the term of this patent is extended or adjusted under 35 U.S.C. 154(b) by 211 days.

(21) Appl. No.: 16/631,380

(22) PCT Filed: Jul. 24, 2018

(86) PCT No.: PCT/US2018/043474
§ 371 (c)(1),
(2) Date: Jan. 15, 2020

(87) PCT Pub. No.: WO2019/036166
PCT Pub. Date: Feb. 21, 2019

(65) Prior Publication Data
US 2020/0164306 A1   May 28, 2020

Related U.S. Application Data

(60) Provisional application No. 62/546,104, filed on Aug. 16, 2017.

(51) Int. Cl.
*B01D 53/28* (2006.01)
*B01D 53/26* (2006.01)
*C10L 3/10* (2006.01)

(52) U.S. Cl.
CPC .......... *B01D 53/28* (2013.01); *B01D 53/263* (2013.01); *C10L 3/106* (2013.01); *B01D 2252/2025* (2013.01); *B01D 2252/50* (2013.01); *B01D 2252/606* (2013.01); *C10L 2290/08* (2013.01); *C10L 2290/541* (2013.01)

(58) Field of Classification Search
None
See application file for complete search history.

(56) References Cited

U.S. PATENT DOCUMENTS 2,384,533 A   9/1945  Chamice
2,812,830 A * 11/1957 Sattler .................... B01D 53/26
                                                            95/191

(Continued)

OTHER PUBLICATIONS

PCT/US2018/043474, International Search Report and Written Opinion with a mailing date of Dec. 13, 2018.

(Continued)

*Primary Examiner* — Tam M Nguyen

(57) ABSTRACT

The present invention relates to a dehydration composition and method of use thereof for drying gas streams, in particular natural gas streams, wherein the dehydration composition comprises a (a) glycol and (b) an additive selected so as to increase the viscosity, surface tension, and/or specific gravity of the dehydration composition. Said dehydration composition and method results in the reduction of solvent loss during the dehydration step in a gas dehydration unit.

14 Claims, 2 Drawing Sheets

(56) References Cited

U.S. PATENT DOCUMENTS

| | | | | |
|---|---|---|---|---|
| 2,988,171 | A * | 6/1961 | Arnold | B01D 53/26 |
| | | | | 95/193 |
| 3,349,544 | A | 10/1967 | Arnold et al. | |
| 3,471,370 | A * | 10/1969 | Jubin, Jr. | C10K 1/16 |
| | | | | 159/46 |
| 3,745,747 | A * | 7/1973 | Psyras | C07C 9/04 |
| | | | | 95/179 |
| 4,375,977 | A | 3/1983 | Honerkamp et al. | |
| 4,661,130 | A | 4/1987 | Ebeling et al. | |
| 4,784,673 | A * | 11/1988 | Blytas | C01B 32/50 |
| | | | | 95/231 |
| 5,116,393 | A * | 5/1992 | Ebeling | B01D 12/00 |
| | | | | 96/265 |
| 5,163,981 | A | 11/1992 | Choi | |
| 5,221,523 | A | 6/1993 | Miles et al. | |
| 5,300,132 | A | 4/1994 | Konijn | |
| 5,536,303 | A * | 7/1996 | Ebeling | B01D 53/263 |
| | | | | 95/227 |
| 5,922,109 | A | 7/1999 | Rooney et al. | |
| 6,964,729 | B1 * | 11/2005 | Khosrowyar | B01D 3/143 |
| | | | | 95/239 |
| 7,935,228 | B1 * | 5/2011 | Rhodes | C10L 3/10 |
| | | | | 95/266 |
| 9,353,315 | B2 * | 5/2016 | Heath | C10L 3/10 |
| 9,695,373 | B2 * | 7/2017 | Moneyhun | B01D 53/1425 |
| 10,799,546 | B1 * | 10/2020 | Jansen | C07D 311/78 |
| 2010/0240934 | A1 * | 9/2010 | Henkelmann | B01J 23/83 |
| | | | | 568/861 |
| 2011/0152580 | A1 * | 6/2011 | Hook | C07C 29/62 |
| | | | | 568/841 |
| 2015/0166899 | A1 * | 6/2015 | Shi | C10B 53/02 |
| | | | | 585/24 |
| 2018/0043300 | A1 * | 2/2018 | Iyer | B01D 53/1425 |
| 2018/0280868 | A1 * | 10/2018 | Laroche | B01D 53/28 |
| 2020/0164306 | A1 * | 5/2020 | Laroche | B01D 53/28 |

OTHER PUBLICATIONS

PCT/US2018/043474, International Preliminary Report on Patentability with a mailing date of Feb. 27, 2020.

* cited by examiner

GAS DEHYDRATION COMPOSITION AND PROCESS TO REDUCE SOLVENT LOSSES

FIELD OF THE INVENTION

The present invention relates to a composition and method of use thereof for drying gas streams, in particular natural gas streams. Said composition and method provides for reduced solvent loss during the step of gas dehydration.

BACKGROUND OF THE INVENTION

Gases, such as natural gas, generally contain varying amounts of water vapor. It is desirable that no water vapor be admitted to a natural gas pipeline. The presence of the water vapor is undesirable as the water vapor can result in corrosion of pipes and cause corrosion of, and stoppages in, valves and fittings in gas pipe transmission systems. Further, quantities of water or moisture that are relatively small may freeze and block the pipeline such that flow is completely halted or at least greatly restricted.

Processes for removal of entrained water vapor and other contaminants in natural gas are well known. The most commonly used process employs glycol dehydration. Before treating a gas for glycol dehydration, it is typically passed into a separator where water droplets, along with droplets of hydrocarbon liquids, entrained sand, rust and so forth is separated from the gas stream. Condensable hydrocarbons and water are generally removed by expanding the high pressure gas from a well so that the resultant temperature drop causes condensation of the condensable.

Subsequent dehydration of the gas is most commonly achieved by contacting it with a desiccant liquid that readily absorbs water. The most commonly used desiccants is glycol either in the form of diethylene glycol (DEG) or triethylene glycol (TEG). Water vapor entrained within the gas stream is absorbed by the glycol desiccant, and the desiccant is then regenerated by heating it to drive off the absorbed water. After the desiccant has been heated to regenerate, it is then recycled for use in the dehydration system. Usually, the heat required for regeneration of the liquid desiccant is obtained by burning a portion of the natural gas.

For background information relating to glycol dehydrator systems for treating natural gas, reference may be had to U.S. Pat. Nos. 5,163,981; 5,116,393; 4,375,977 and 4,661,130.

One problem that has existed with glycol dehydrators is loss of glycol solvent. Loss of glycol solvent can result in a significant cost. Glycol losses from gas dehydration units are grouped into three categories: (1) vaporization, (2) carry over, and (3) mechanical.

Vaporization loss takes place both in glycol contactor as well as in glycol still of regenerator. The equilibrium vaporization loss from contactor is normally 5 percent of normal loss and is primarily due to higher gas inlet temperature. The vaporization loss in glycol still is due to higher still temperature and high stripping gas rate.

The carry over loss in absorber is generally due to foaming, high gas velocity and inadequate mist eliminator at gas outlet. The carryover loss in glycol still is due to high stripping gas velocity and foaming in still column.

The foaming in absorber or still is primarily due to contaminants brought along with inlet gas, thermal degradation of glycol and corrosion products circulated along with glycol. These contaminants are carried along with the rich TEG to the reboiler, if they are not removed from glycol by the filtration system. In reboiler some of these may degrade further and all are recirculated back to the absorber.

There remains a need for an improved dehydration solvent composition and process to reduce the amount of solvent loss in a gas dehydration unit.

SUMMARY OF THE INVENTION

In one embodiment, the present invention is a gas dehydration composition comprising a glycol and method of use to remove water from a gas, preferably natural gas.

Another embodiment of the present invention is a process to reduce glycol loss in a gas dehydration unit, preferably a natural gas dehydration unit, comprising a dehydration column, wherein the dehydration column is positioned vertically and has a wet gas inlet at the bottom of the column and a dry gas outlet at the top of the column, said column comprising: (i) a contact zone in an absorption section of the column having one or more bubble tray wherein if there are two or more bubble trays there is an upper most and a lower most bubble tray, (ii) a demister located between the upper most bubble tray and the gas outlet, and (iii) a dehydration composition which enters the column above the upper most bubble tray and exits the column below the lower most bubble tray, said dehydration composition comprising: (a) from 50 to 75 weight percent of a glycol, preferably monoethylene glycol, diethylene glycol, triethylene glycol, tetraethylene glycol, monopropylene glycol, dipropylene glycol, tripropylene glycol, or tetrapropylene glycol and (b) from 25 to 50 weight percent glycerine, diglycerine, triglycerine, erythritol, pentaerythritol, trimethylolmethane, or mixtures thereof, weight percents are based on the total weight of the dehydration composition, said process comprising the steps of: (A) contacting a wet gas counter-currently in the contact zone of the dehydration column with a lean dehydration composition to form a dry gas and a water rich dehydration composition and (B) having the dry gas pass through the demister prior to exiting the dehydration column.

In another embodiment of the composition and process of the present invention, the dehydration composition described herein above, further comprises one or more component selected from: (c) an alkanolamine, a phosphate acid or salt compound, a borate acid or salt compound, a sweetening agent, a low temperature viscosity improver, a corrosion inhibitor, an antifoaming agent, or mixtures thereof.

DETAILED DESCRIPTION OF THE INVENTION

Figure 1:
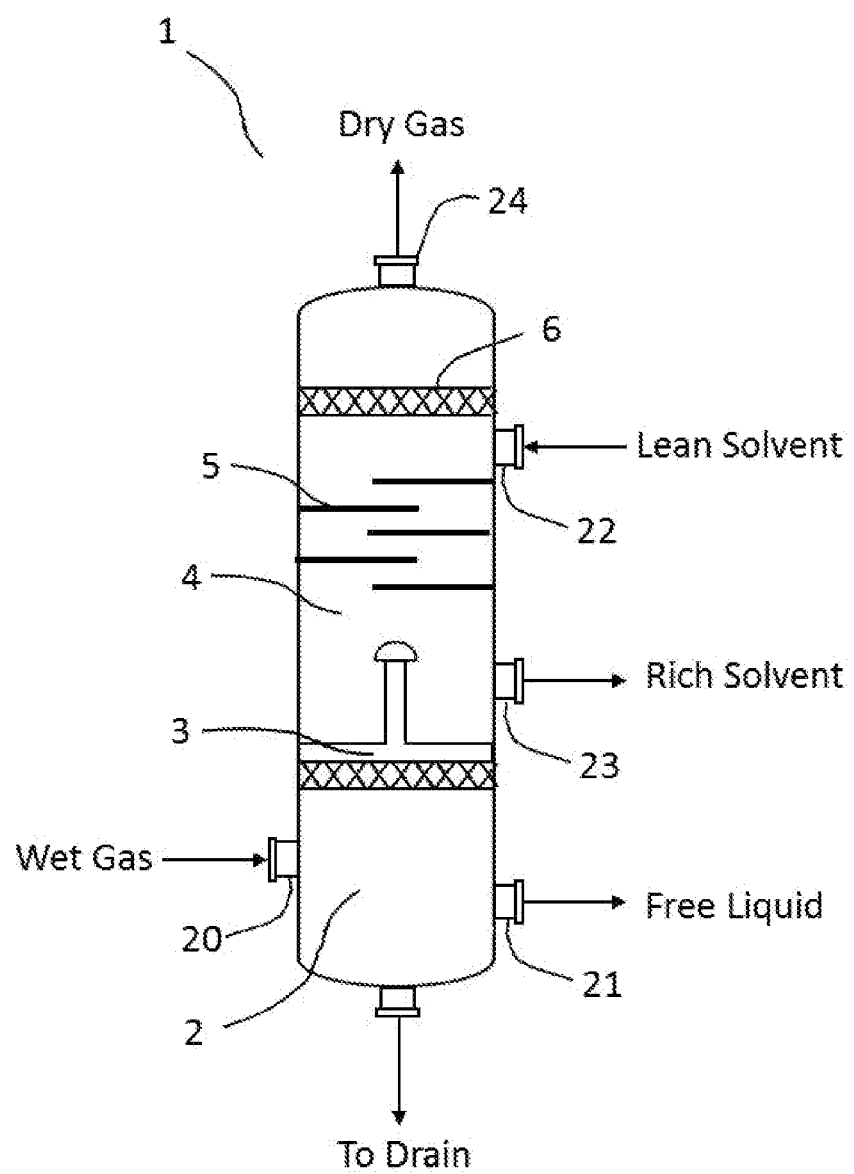
FIG. 1 depicts a schematic of a dehydration column for use in a solvent dehydration process to remove water from a gas.

The dehydration compositions of the present invention may be used to remove water from any gas comprising water, they are particularly suited for removing water from any gas comprising water, and are particularly suited for use with raw and/or treated natural gas. Raw natural gas comes from three types of wells: oil wells, gas wells, and condensate wells. Natural gas that comes from oil wells is typically termed "associated gas". This gas can exist separate from oil in the formation (free gas), or dissolved in the crude oil (dissolved gas). Natural gas from gas and condensate wells, in which there is little or no crude oil, is termed "non-associated gas". Gas wells typically produce raw natural gas by itself, while condensate wells produce free natural gas along with a semi-liquid hydrocarbon condensate. Whatever the source of the natural gas, once separated from crude oil (if present) it commonly exists as a mixture of methane and other hydrocarbons, water, salts, and other impurities, such as acid gases. The term "natural gas" as used herein below includes any natural gas source comprising water including raw or treated natural gas. Treated natural gas is raw natural gas that has been treated one or more times to remove one or more impurities.

The process of dehydrating a gaseous fluid using a glycol is well known in the art, such as is described by the processes in U.S. Pat. No. 2,988,171 and Kohl et al., "Gas Purification" $4^{th}$ Edition, 1985, Gulf Publishing Company. However, it will be apparent to those skilled in the art that such a counter-current system could be used for drying other gases as well. These known processes can be used with the dehydrating compositions of the present invention. Preferably, the gas is contacted with the dehydrating composition in a continuous counter-current flow process. When the gaseous fluid is natural gas, the process generally passes the gas into the bottom of an absorber unit, equipped with baffles, trays, random packing, structured packing, or combination thereof, where the gas is contacted counter-currently in the contact zone with a lean dehydrating composition to remove the water. The dry gas exits the top of the absorber unit and the rich dehydrating composition is removed from the bottom of the absorber unit and pumped to a series of heat exchanges or to a flash tank or larger units. After the flash tank, or directly from the smaller absorber units, the rich dehydrating composition passes through a series of heat exchangers and filters before going to a still and regenerator, where water is stripped from the dehydrating composition.

The temperature and pressure of the gas to be dehydrated can have an effect on the process of this invention. For example, for natural gas containing primarily methane, the temperature of the gas to be dehydrated will usually be within the range of about 20° C. to 45° C., having been reduced from higher temperatures when discharged from its underground source. Pressure during dehydration is usually increased to between about 500 to 1,000 psi. At this temperature, the gas will contain about 0.5 to 5 percent by weight of water.

Water-rich dehydration composition of the present invention is pumped through a closed-loop (of which the absorber is part) including various filters, strippers, heat exchangers, etc., and a reboiler wherein the water-rich dehydration composition of the present invention is conventionally heated and maintained at a temperature of from 120° C. to about 225° C., preferably at a temperature from 150° C. to 220° C., such that the water is driven off. All or part of the resulting lean regenerated dehydration composition of the present invention may then be returned through the remaining portion of the loop back to the absorber, again to flow in countercurrent exchange with natural gas comprising water.

Referring to FIG. 1, the schematic flow sheet shows a representative dehydration column 1 used in a gas dehydration unit. Wet gas containing an undesirable level of water enters the column 1 at the bottom 20. In some gas dehydration units, a separator is separate from the dehydration column (not shown in the drawings). In the dehydration column 1 shown in FIG. 1, the separator 2 is incorporated in a bottom section of the column 1. The wet gas flows through the separator 2 to remove condensed liquids or any solids that might be in the gas. The condensed liquids and any solids may leave the bottom of the column 21 as free liquid.

After passing through the separator 2, the gas then flows upward through a chimney tray 3 into the glycol absorber portion of the column 4 The glycol absorber portion or contact zone of the column 4 can contain bubble trays 5 (as shown in drawing) or random packing or structured packing (not shown in the drawing.

Lean glycol is pumped into the upper portion of the contactor 22, above the top tray 5 but below the demister 6. The trays 5 are flooded with glycol that flows downward through the absorber portion of the column 4 from tray 5 to tray 5. The gas rises through the bubbles and is dispersed as bubbles through the glycol on the trays 5. This provides the intimate contact between the gas and the glycol. The glycol is highly hygroscopic, and most of the water vapor in the gas is absorbed by the glycol. The rich glycol, containing the absorbed water, is withdrawn from the contactor near the bottom of the vessel 23 above the chimney tray 3 through a liquid level control valve and passes to the regeneration section (not shown in the drawings). The dry gas leaves the column at the top 24 having first passed through a demister 6.

Typically, the rich glycol is regenerated and reused (not shown in the drawings). The rich glycol is routed through a heat exchange coil in the top of a reboiler column called the still. The heat exchange generates some reflux for the separation of the water from the glycol in the top of the still and also heats the rich glycol somewhat. In some installations, the rich solution passes to a flash tank operating at about 15 to 50 psig, which allows any absorbed hydrocarbon gas to separate from the glycol. The glycol then flows into the still through a filter and a heat exchanger, exchanging heat with the regenerated glycol. It drops through a packed section in the still into the glycol reboiler vessel, where it is heated to the necessary high regeneration temperature at near atmospheric pressure. At the high temperature, the glycol loses its ability to hold water; the water is vaporized and leaves through the top of the still. The regenerated glycol flows to the surge tank, from which it is routed through the lean/rich heat exchanger to the glycol pump. The pump boosts the pressure of the lean glycol to the dehydration column pressure. Prior to entering the dehydration column, it may exchange heat with the dry gas leaving the contactor or some other heat exchange medium.

A significant amount of glycol solvent may be lost due to entrainment in the dry gas as it passes through the demister 6 and leaves 24 the dehydration column 1. We have found that by altering one or more of the glycol solvent properties we can significantly reduce the amount of solvent loss in the dry gas as it passes through the demister 6 and before leaving 24 the column 1.

Figure 2:
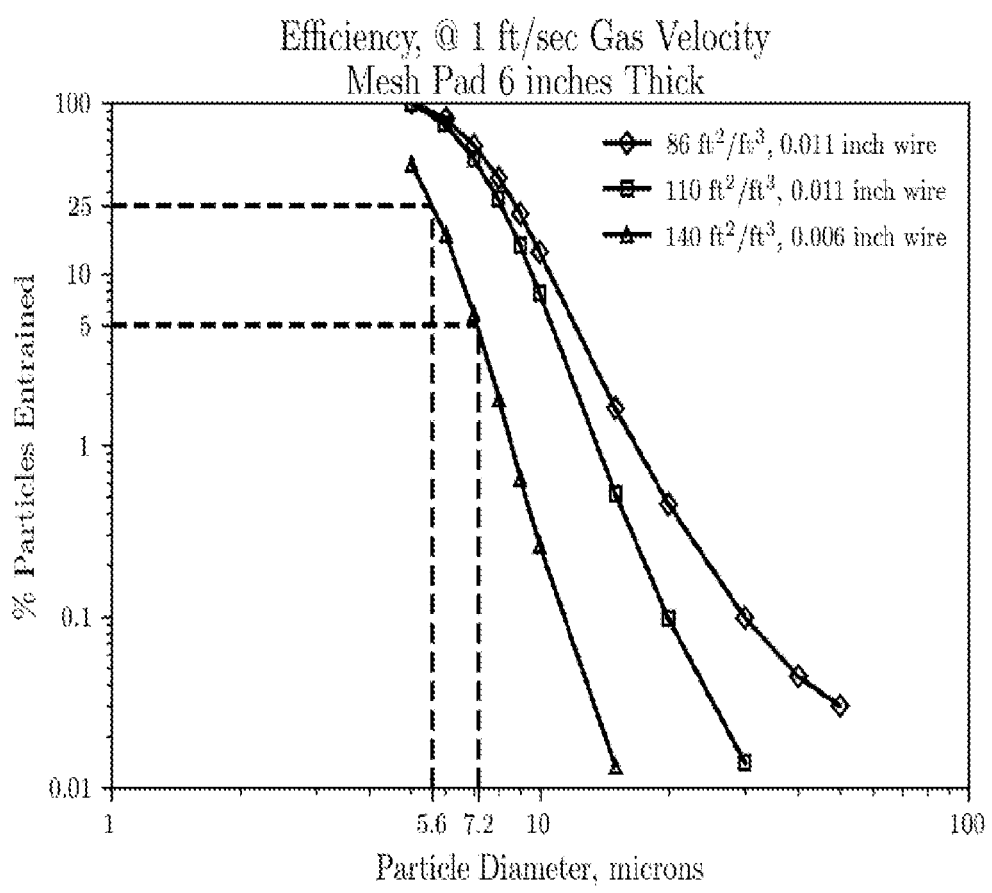
FIG. 2 is a plot of particle entrained efficiency for different size meshes at a fixed gas velocity.

Not to be held to any particular theory, we believe that demister efficiencies can be directly correlated with the entrained particle size that they are intended to capture. As shown in FIG. 2, an increase of the entrained particle size from 5.6 micron to 7.2 micron leads to a decrease of the percent particle entrained from 25% to 5%. In other words, a 0.3 fold increase in entrained particle size yields a 5 fold increase in glycol recovery.

One embodiment of the present invention is a method to alter the droplet size of the dehydration solvent entrained in the dry gas entering the demister by controlling one or more liquid properties, including, but not limited to, for example viscosity, surface tension, and/or density, One embodiment of the present invention, is a dehydrating glycol composition with higher viscosity, surface tension, and specific gravity as compared to the glycol alone. The dehydration composition of the present invention comprises, consists essentially of, consists of (a) equal to or less than 75 weight percent of a glycol and (b) equal to or greater than 25 weight percent glycerine, diglycerine, triglycerine, erythritol, pentaerythritol, trimethylolmethane, or mixtures thereof.

The glycols usually employed as component (a) are mono-, di-, tri-, and tetraethylene glycol and mono-, di-, tri-, and tetrapropylene glycol. Penta- and hexaethylene glycol and penta- and hexapropylene glycol may be employed, however; the higher glycols have higher viscosities making them less suitable for the present application. In addition, higher glycols may co-absorb higher concentration of hydrocarbon which could be detrimental during the dehydration of a stream of methane, ethane, or propane. Preferably the glycol is selected from triethylene glycol, ethylene glycol (monoethylene glycol), diethylene glycol, tripropylene glycol, or mixtures thereof. The more preferred glycol is triethylene glycol. The glycol is present in an amount from 30 to 90 weight percent based on the total weight of the dehydration composition. Preferably, the glycol is present in the dehydration composition in an amount equal to or greater than 45 weight percent, more preferably equal to or greater than 50 weight percent, more preferably equal to or greater than 55 weight percent, based on the total weight of the dehydration composition. Preferably, the glycol is present in the dehydration composition in an amount equal to or less than 75 weight percent, more preferably equal to or less than 70 weight percent based on the total weight of the dehydration composition.

The glycerine (b) is present in an amount from 10 to 70 weight percent based on the total weight of the dehydration composition. Preferably, the glycine is present in the dehydration composition in an amount equal to or greater than 10 weight percent, more preferably equal to or greater than 15 weight percent, more preferably equal to or greater than 25 weight percent, based on the total weight of the dehydration composition. Preferably, the glycol is present in the dehydration composition in an amount equal to or less than 60 weight percent, more preferably equal to or less than 50, more preferably in an amount equal to or less than 40 weight percent based on the total weight of the dehydration composition.

In another embodiment of the compositions of the present invention, the dehydration composition may further comprise one or more additional component (c) including, but not limited to: an alkanolamine, such as monoethanolamine (MEA), diethanolamine (DEA), methyldiethylanolamine (MDEA), or triethanolamine (TEA), see U.S. Pat. No. 3,349,544 which is incorporated by reference herein in its entirety; a phosphate acid or salt compound, such as phosphoric acid, potassium phosphate, dipotassium phosphate, disodium phosphate, or trisodium phosphate, see U.S. Pat. No. 2,384,553 which is incorporated by reference herein in its entirety; a borate compound, for example any salt of boric acid which is in the dehydration composition including alkali metal metaborates and tetraborates; an antifoaming agents, for example silicone based defoamers and EO/PO based defoamers such as polysiloxane and polypropylene glycol copolymers, or a corrosion inhibitor. If present, these ingredients are used independently in an amount of from 0.01 weight percent to 25, preferably 0.1 to 10 weight percent based on the total weight of the dehydration composition.

In one embodiment of the present invention, the pH of the dehydration compositions, whether a concentrate or diluted fluid, are controlled for purposes of corrosion protection. Preferably, the compositions should have a pH of equal to or greater than 7 to equal to or less than 11. Preferably the dehydration composition of the present invention has a pH of equal to or greater than 7, more preferably equal to or greater than 7.5, more preferably equal to or greater than 8. Preferably the dehydration composition of the present invention has a pH of equal to or less than 11, more preferably equal to or less than 10, more preferably equal to or less than 9. Borate compounds are particularly suitable to control the pH. Control of the pH is provided by appropriate adjustment of the level of borate compound to maintain the pH within the desired range.

EXAMPLES

The dehydration compositions of the present invention comprise one or more of the following:

"TEG" is triethylene glycol available from Alfa Aesar at 99% purity;

"GLY" is glycerine available from Sigma Aldrich at greater than 99.5% purity;

or

"$Na_2B_4O_7$" is sodium tetraborate available from Sigma Aldrich at 99% purity.

The following test procedures are used to characterize the dehydration compositions:

"Density" and "Viscosity" are determined using an Anton Paar stabinger viscometer SVM 3000 at 25° C.
and "Surface Tension" is determined using a force tensiometer KRUSS K100 at room temperature.

The compositions and properties for Examples 1 to 9 are shown in Table 1, amounts are in weight percent based on the total weight of the dehydration compositions.

TABLE 1

| Example | TEG, wt % | GLY, wt % | $N_2B_4O_7$, wt % | Density, g/cm³ | Viscosity, Cp | Surface Tension, mN/m |
|---|---|---|---|---|---|---|
| 1 | | | | 1.1136 | 27.86 | 46.136 |
| 2 | | 1 | | 1.1148 | 28.56 | 46.142 |
| 3 | | 2 | | 1.1161 | 29.27 | 46.168 |
| 4 | | 5 | | 1.12 | 31.68 | 46.467 |
| 5 | | 10 | | 1.1265 | 36.16 | 46.905 |
| 6 | | 25 | | 1.146 | 54.07 | 48.214 |
| 7 | | 25 | 0.5 | 1.1486 | 59.064 | |
| 8 | | 25 | 1 | 1.1511 | 63.952 | |
| 9 | | 25 | 2 | 1.1557 | 73.282 | |

Demister efficiency at 1 ft/sec gas velocity with a mesh pad 6 inches thick is shown in FIG. 2.

What is claimed is:

1. A process to reduce glycol loss in a gas dehydration unit comprising a dehydration column, wherein the dehydration column is positioned vertically and has a wet gas inlet at the bottom of the column and a dry gas outlet at the top of the column, said column comprising:
   (i) a contact zone in an absorption section of the column having two or more bubble trays, wherein there is an upper most and a lower most bubble tray,
   (ii) a demister located between the upper most bubble tray and the gas outlet, and
   (iii) a gas dehydration composition which enters the column above the upper most bubble tray and below the demister, and exits the column below the lower most bubble tray, said gas dehydration composition comprising at least 50 weight percent of a glycol,
said process comprising the steps of:
(A) contacting a wet gas counter-currently in the contact zone of the dehydration column with a lean gas dehydration composition to form a dry gas and a water rich dehydration composition and
(B) having the dry gas pass through the demister prior to exiting the dehydration column'
wherein the gas dehydration composition is modified to increase the droplet size of the dehydration solvent entrained in the dry gas entering the demister by controlling one or more liquid properties of the gas dehydration composition, which property is selected from the group consisting of viscosity, surface tension, density and combinations thereof.

2. The process of claim 1 wherein the gas dehydration unit is a natural gas dehydration unit and the gas is natural gas.

3. The gas dehydration composition of the process of claim 1 wherein
(a) the glycol is monoethylene glycol, diethylene glycol, triethylene glycol, tetraethylene glycol, monopropylene glycol, dipropylene glycol, tripropylene glycol, or tetrapropylene glycol.

4. The process of claim 1 wherein the gas dehydration composition further comprises one or more component selected from:
(c) an alkanolamine, a phosphate acid or salt compound, a borate acid or salt compound, a sweetening agent, a low temperature viscosity improver, a corrosion inhibitor, an antifoaming agent, or mixtures thereof.

5. The gas dehydration composition of the process of claim 1 wherein
(a) the glycol is triethylene glycol, monoethylene glycol, diethylene glycol, tripropylene glycol, or mixtures thereof.

6. The gas dehydration composition of the process of claim 1 wherein the gas dehydration composition further includes sodium tetraborate.

7. The process of claim 1 wherein the modified gas dehydration composition has a viscosity at 25° C. of 54 Cp or more.

8. The process of claim 1 wherein the droplet size of the gas dehydration composition is increased by the addition of a modifier selected from the group consisting of glycerine, diglycerine, triglycerine, erythritol, pentaerythritol, trimethylolmethane, or mixtures thereof, and where the modifier is added in an amount such that the gas dehydration composition comprises at least 25 weight percent of the modifier.

9. The process of claim 8 wherein the modifier is glycerine.

10. The gas dehydration composition of the process of claim 9 wherein the glycol is triethylene glycol and the gas dehydration composition includes from 50 to 75 weight percent of triethylene glycol and from 25 to 50 weight percent of glycerine.

11. The gas dehydration composition of the process of claim 10 wherein the gas dehydration composition further comprising from 0.1 to 10 weight percent of sodium tetraborate.

12. The gas dehydration composition of the process of claim 11 wherein the gas dehydration composition consists essentially of triethylene glycol, glycerine, and sodium tetraborate.

13. The process of claim 1 wherein the average particle diameter of the gas dehydration composition droplets entrained in the dry gas entering the demister is increased by at least thirty percent compared to the unmodified gas dehydration composition.

14. A process to reduce glycol loss in a gas dehydration unit comprising a dehydration column, wherein the dehydration column is positioned vertically and has a wet gas inlet at the bottom of the column and a dry gas outlet at the top of the column, said column comprising:
(i) a contact zone in an absorption section of the column having two or more bubble trays, wherein there is an upper most and a lower most bubble tray,
(ii) a demister located between the upper most bubble tray and the gas outlet, and
(iii) a gas dehydration composition which enters the column above the upper most bubble tray and below the demister, and exits the column below the lower most bubble tray, said gas dehydration composition comprising at least 50 weight percent of a glycol, said process comprising the steps of:
(A) contacting a wet gas counter-currently in the contact zone of the dehydration column with a lean gas dehydration composition to form a dry gas and a water rich dehydration composition and
(B) having the dry gas pass through the demister prior to exiting the dehydration column'
wherein the gas dehydration composition is modified to increase the droplet size of the dehydration solvent entrained in the dry gas entering the demister by controlling one or more liquid properties of the gas dehydration composition, which property is selected from the group consisting of viscosity, surface tension, density and combinations thereof; and
wherein the droplet size of the gas dehydration composition is increased by the addition of a modifier selected from the group consisting of glycerine, diglycerine, triglycerine, erythritol, pentaerythritol, trimethylolmethane, or mixtures thereof, and where the modifier is added in an amount such that the gas dehydration composition comprises at least 25 weight percent of the modifier.

* * * * *